(12) United States Patent
Fischer

(10) Patent No.: US 12,140,062 B2
(45) Date of Patent: Nov. 12, 2024

(54) EXHAUST-GAS AFTERTREATMENT SYSTEM FOR AN INTERNAL COMBUSTION ENGINE

(71) Applicant: TENNECO GMBH, Edenkoben (DE)

(72) Inventor: Michael Fischer, Mainz (DE)

(73) Assignee: Tenneco GmbH, Edenkoben (DE)

( * ) Notice: Subject to any disclaimer, the term of this patent is extended or adjusted under 35 U.S.C. 154(b) by 250 days.

(21) Appl. No.: 17/619,803

(22) PCT Filed: Jun. 12, 2020

(86) PCT No.: PCT/EP2020/066338
§ 371 (c)(1),
(2) Date: Dec. 16, 2021

(87) PCT Pub. No.: WO2020/260041
PCT Pub. Date: Dec. 30, 2020

(65) Prior Publication Data
US 2022/0349329 A1    Nov. 3, 2022

(30) Foreign Application Priority Data

Jun. 27, 2019  (DE) .................. 10 2019 117 415.5
Jul. 18, 2019  (DE) .................. 10 2019 119 549.7
Sep. 9, 2019  (DE) .................. 20 2019 105 537.5

(51) Int. Cl.
*F01N 3/00* (2006.01)
*F01N 3/021* (2006.01)
(Continued)

(52) U.S. Cl.
CPC ........... *F01N 3/2053* (2013.01); *F01N 3/021* (2013.01); *F01N 3/101* (2013.01); *F01N 3/2882* (2013.01);
(Continued)

(58) Field of Classification Search
CPC ........ F01N 3/2053; F01N 3/021; F01N 3/101; F01N 3/2882; F01N 3/2892;
(Continued)

(56) References Cited

U.S. PATENT DOCUMENTS 9,593,619 B2 *  3/2017  Zhang ...................... F01N 9/00
9,909,517 B2 *  3/2018  Kothandaraman ..........................
                                                    F02D 41/2422
(Continued)

FOREIGN PATENT DOCUMENTS

DE    19833619 A1    1/2000
DE    10021421 A1    2/2002
(Continued)

*Primary Examiner* — Matthew T Largi
(74) *Attorney, Agent, or Firm* — Harness, Dickey & Pierce, P.L.C.

(57) ABSTRACT

The disclosure relates to an exhaust gas aftertreatment system with a turbine arranged in the exhaust gas line and with a main catalytic converter arranged downstream from the turbine, wherein the exhaust gas line has a bypass line and a bypass connector, wherein the bypass line opens downstream from the turbine, wherein a main particle filter and, in the bypass line, a catalytic converter are provided, wherein the bypass valve a1) is formed as a three-way valve is and forms the bypass connector a2) the bypass valve is formed as a three-way valve and is provided at the opening b1) is positioned in the bypass line, wherein an exhaust gas flap is provided upstream from the opening in the exhaust gas line b2) the exhaust gas line is formed without exhaust gas flaps downstream from the bypass connector and upstream from the opening, and the catalytic converter has a three-way coating or the respective main catalytic converter has a DOC coating.

10 Claims, 7 Drawing Sheets

(51) Int. Cl.
 *F01N 3/10* (2006.01)
 *F01N 3/20* (2006.01)
 *F01N 3/28* (2006.01)
 *F01N 13/00* (2010.01)

(52) U.S. Cl.
 CPC ......... *F01N 3/2892* (2013.01); *F01N 13/009* (2014.06); *F01N 13/011* (2014.06); *F01N 2240/36* (2013.01); *F01N 2340/06* (2013.01); *F01N 2410/00* (2013.01)

(58) Field of Classification Search
 CPC .. F01N 13/009; F01N 13/011; F01N 2240/36; F01N 2340/06; F01N 2410/00; F01N 3/105
 See application file for complete search history.

(56) References Cited

U.S. PATENT DOCUMENTS

| | | | |
|---|---|---|---|
| 2009/0077954 A1* | 3/2009 | Winsor | F01N 3/101 60/301 |
| 2010/0064686 A1* | 3/2010 | Mondori | F02D 41/0065 60/287 |
| 2011/0072799 A1* | 3/2011 | Bidner | F01N 9/00 60/286 |
| 2011/0179770 A1* | 7/2011 | Schmuck-Soldan | F02B 37/18 60/299 |
| 2011/0271673 A1 | 11/2011 | Koenigsegg | |
| 2014/0109553 A1* | 4/2014 | Roberts, Jr. | F01N 13/0093 60/274 |
| 2016/0177887 A1* | 6/2016 | Fischer | F02M 26/15 60/605.2 |
| 2016/0348615 A1 | 12/2016 | Fischer | |
| 2018/0128213 A1* | 5/2018 | Fischer | F02M 26/35 |
| 2018/0171903 A1* | 6/2018 | Aronsson | F02M 26/08 |
| 2019/0136754 A1* | 5/2019 | Brin | F01N 13/10 |

FOREIGN PATENT DOCUMENTS

| | | |
|---|---|---|
| DE | 202017105126 U1 | 9/2017 |
| DE | 102017119537 A1 | 2/2019 |
| DE | 102018121044 A1 | 3/2019 |
| DE | 102018104275 A1 | 8/2019 |
| DE | 102018104605 A1 | 8/2019 |
| DE | 102019119148 A1 | 8/2019 |
| EP | 1405995 A1 | 4/2004 |
| EP | 1152133 B1 | 7/2006 |
| JP | 3648809 B2 | 5/2005 |
| WO | 2016189028 A1 | 12/2016 |

* cited by examiner

EXHAUST-GAS AFTERTREATMENT SYSTEM FOR AN INTERNAL COMBUSTION ENGINE

CROSS-REFERENCE TO RELATED APPLICATIONS

This application is a U.S. National Phase Application under 35 U.S.C. 371 of International Application No. PCT/EP2020/066338, filed on Jun. 12, 2020, which claims the benefit of German Patent Application No. 10 2019 117 415.5, filed on Jun. 27, 2019, German Patent Application No. 10 2019 119 549.7, filed on Jul. 18, 2019, and German Patent Application No. 20 2019 105 537.5, filed on Sep. 9, 2019. The entire disclosures of the above applications are incorporated herein by reference.

FIELD

The disclosure relates to an exhaust gas control system for an internal combustion engine with an exhaust gas line connectable to an exhaust manifold of the engine, with a turbine arranged in the exhaust gas line and with at least one main catalytic converter arranged downstream from the turbine, wherein the exhaust gas line has a bypass line and a bypass connector for the bypass line, wherein the bypass connector is provided upstream from the turbine on the exhaust gas line, wherein the bypass line opens into the exhaust gas line downstream from the turbine at an opening upstream from the main catalytic converter, wherein a bypass valve is provided in the bypass line. The opening represents the junction of the bypass line and the exhaust gas line.

The disclosure also relates to an exhaust gas control system for an internal combustion engine with an exhaust gas line connectable to an exhaust manifold of the engine, with a turbine arranged in the exhaust gas line and with a main catalytic converter arranged downstream from the turbine, wherein the exhaust gas line has a bypass line and a bypass valve, wherein the bypass valve is positioned on the exhaust gas line upstream from the turbine, wherein the bypass line opens into the exhaust gas line at an opening downstream from the turbine.

BACKGROUND

This section provides background information related to the present disclosure which is not necessarily prior art.

An exhaust gas control system with a combined exhaust gas recirculation and bypass line is already known from WO 2016/189028 A1.

An exhaust gas control system is also known from DE 20 2017 105 126 U1 which has a combined exhaust gas recirculation and bypass line using three-way valves.

SUMMARY

This section provides a general summary of the disclosure, and is not a comprehensive disclosure of its full scope or all of its features.

It is the object of the disclosure to form and arrange an exhaust gas aftertreatment system in such a manner that the warm-up behavior of the exhaust gas control system is improved.

The object is achieved according to the disclosure in that a main particle filter is provided in the exhaust gas line downstream from the turbine and a catalytic converter is provided in the bypass line, wherein the bypass valve is formed as a three-way valve and forms the bypass connector upstream from the turbine or the bypass valve is formed as a three-way valve and is provided at the opening.

In both cases, the bypass valve additionally functions as an exhaust gas flap in the exhaust gas line.

Alternatively, the bypass valve is positioned in the bypass line, wherein an exhaust gas flap is provided upstream from the opening in the exhaust gas line, wherein the turbine has fixed vanes or the turbine is formed as a VTG turbine or as a VNT turbine.

In another alternative, the exhaust gas line does not have an exhaust gas flap downstream from the bypass connector and upstream from the opening, wherein the valve function for regulating the exhaust gas mass flow through the turbine is associated with the VTG turbine or the VNT turbine.

Another feature of the solution is that the internal combustion engine is formed as a spark ignition engine, wherein the respective catalytic converter, namely the main catalytic converter and the catalytic converter in the bypass line, has a three-way coating or that the internal combustion engine is formed as a diesel engine, wherein the respective main catalytic converter, namely the main catalytic converter and the catalytic converter of the bypass line, has a DOC coating.

A final feature of the solution is that the further bypass line is formed without bypass valves with the exception of the bypass valve. This therefore ensures a low level of structural and assembly complexity.

The exhaust gas flap is located downstream from the bypass connector and can be positioned upstream from or downstream from the turbine.

By using the three-way bypass valve or the bypass valve in combination with the exhaust gas flap, it is possible during a cold start to close off the exhaust gas line with the turbine or to prevent exhaust gas flow therethrough. The catalytic converter in the bypass line can therefore be warmed up very quickly. The time taken to reach the catalytic converter's "light-off temperature" is shortened. During or after warming up of the catalytic converter in the bypass line, the main catalytic converter is preheated, such that, once sufficient preheating has occurred, the exhaust gas line with the turbine can subsequently be switched in. While the still cold turbine will indeed initially somewhat cool down the exhaust gas, the preheating of the main catalytic converter is capable of ensuring adequate exhaust gas purification.

In an alternative embodiment, the turbine is a "VTG" or a "VNT" turbine. This kind of turbine has adjustable vanes, by means of which the angle of attack of the vanes can be adjusted and the effective exhaust gas cross-section of the turbine regulated, namely increased or reduced in size. Depending on the turbine used, the effective exhaust gas cross-section can be reduced in size by up to 70% to 99%. During a cold start, the exhaust gas line with the turbine can be closed off to 30%-1% of the exhaust gas flow or an exhaust gas flow can be substantially prevented as a consequence. The catalytic converter in the bypass line as well as the downstream main catalytic converter can therefore be correspondingly quickly warmed up.

The size ratio between the catalytic converter in the bypass line and the main catalytic converter may vary between 1/10 and 1/2.

If the main particle filter is positioned upstream from the main catalytic converter, the main catalytic converter is kept free of exhaust gas particles and fouling is prevented. The catalytic converter in the bypass line can be made very small and can thus be warmed up very quickly after a cold start.

It may also be advantageous to this end if the exhaust gas flap or an exhaust gas flap body is able to be brought into at most two defined positions determined by an end abutment. Exhaust gas temperatures are very high in the bypass line upstream from the turbine or upstream from the catalyst. The valves used there must be robustly designed, something which goes hand in hand with a simple structure and a simple drive.

In addition, it may also be advantageous for a particle filter additionally to be provided in the bypass line or, depending on the particular application, for the bypass line to be formed without a particle filter. This goes hand in hand with relatively low design and structural complexity.

The object is achieved according to the disclosure in that a main particle filter is provided downstream from the turbine in the exhaust gas line and in that a particle filter and a catalytic converter are provided in the bypass line, wherein the opening of the bypass line is provided downstream from the main catalytic converter and downstream from the main particle filter. The exhaust gas can thus be completely purified both via the bypass line and via the exhaust gas line. The purification components in the bypass line are smaller and thus quicker to warm up.

An additional feature of the solution is that the internal combustion engine is formed as a spark ignition engine, wherein the respective catalytic converter, namely the main catalytic converter and the catalytic converter of the bypass line, has a three-way coating or that the internal combustion engine is formed as a diesel engine, wherein the respective main catalytic converter, namely the main catalytic converter and the catalytic converter of the bypass line, has a DOC coating.

The size ratio between the purification components in the bypass line and the purification components in the exhaust gas line may vary between 1/10 and 1/2.

In both solutions, the catalyst coating of the catalytic converter in the bypass line and the catalyst coating of the main catalytic converter can be differently formed. The catalytic coating of the catalytic converter in the bypass line preferably has a lower light-off temperature.

It may also be advantageous for the bypass line to have a coupling line which branches off upstream from the particle filter and upstream from the catalytic converter in the bypass line and which opens into the exhaust gas line upstream from the main particle filter and upstream from the main catalytic converter. The otherwise closed off purification modules, the main particle filter and the main catalytic converter in the exhaust gas line, can be charged or preheated with exhaust gas via the coupling line.

It may be of particular significance for the present disclosure for an exhaust gas control valve to be provided in the exhaust gas line downstream from the main particle filter, downstream from the main catalytic converter and upstream from the opening, which is able to be brought into more than two defined positions and via which the exhaust gas volume flow within the exhaust gas line is controllable in more than two settings. The exhaust gas flow guided via the main particle filter and the main catalytic converter can thus be continuously regulated or raised by the bypass valve when the turbine is shut off.

In connection with the configuration and arrangement according to the disclosure, it may be advantageous for the exhaust gas line to be formed without exhaust gas recirculation lines or for the exhaust gas line to have an exhaust gas recirculation line upstream from the turbine, wherein the EGR connector is positioned upstream or downstream from the bypass connector. The bypass line consequently has no branch point for exhaust gas to be recirculated. The bypass and EGR systems are separate on the exhaust gas side. This goes hand in hand with more flexible control of exhaust gas flow.

It may furthermore be advantageous to this end if the bypass valve or the respective valve body is able to be brought into at most two defined positions determined by an end abutment. Exhaust gas temperatures are very high upstream from the turbine or upstream from the catalyst. The valves used there must be robustly designed, something which goes hand in hand with a simple structure and a simple drive.

It may furthermore be advantageous for the catalytic converter and the particle filter in the bypass line to be formed as particle filters with a catalytically acting three-way or DOC coating. This goes hand in hand with the necessity for an individual substrate for filtration and for chemical purification, namely for converting CO, HC and NOx by the three-way coating or for oxidizing hydrocarbons or diesel by the DOC coating.

To this end, a method for operating an exhaust gas control system as previously described may be advantageous, wherein the exhaust gas line is closed off by means of the exhaust gas flap during a cold start and the entire exhaust gas flow is guided via the bypass line to the opening and to the further exhaust gas system when the bypass valve is open. This goes hand in hand after a cold start with quick warming up of the catalytic converter in the bypass line.

In addition, a method for operating an exhaust gas control system as previously described may be advantageous, wherein an exhaust gas volume flow A is guided into the bypass line via the bypass valve, wherein at least a part of the exhaust gas volume flow A is guided via the coupling line into the exhaust gas line by corresponding opening of the exhaust gas control valve. During exhaust gas guidance via the bypass line, the exhaust gas line can be gradually switched in, such that continuous preheating of the main catalytic converter is possible.

Further areas of applicability will become apparent from the description provided herein. The description and specific examples in this summary are intended for purposes of illustration only and are not intended to limit the scope of the present disclosure.

Further advantages and details of the disclosure are set out in the claims and the description and shown in the figures.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
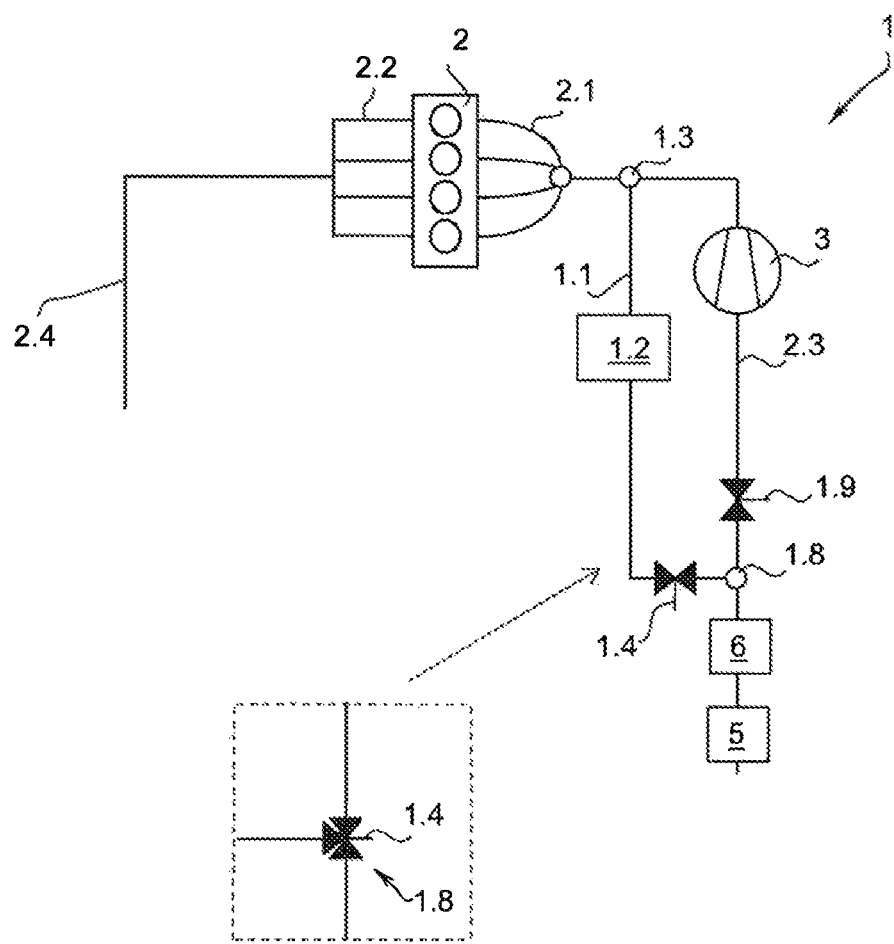
FIG. 1 shows an exhaust gas aftertreatment system.

FIG. 1 shows an exhaust gas aftertreatment system 1 for a spark ignition engine 2 with a exhaust gas line 2.3 and a fresh air line 2.4. While the fresh air line 2.4 is connected to the spark ignition engine 2 via an inlet manifold 2.2, the exhaust gas line 2.3 is connected to the spark ignition engine 2 via an exhaust manifold 2.1. The exhaust gas line 2.3 additionally has a turbine 3 and a main exhaust gas particle filter 6 and a main exhaust gas catalyst 5.

In addition, the exhaust gas line 2.3 has a bypass line 1.1 which branches off at a bypass connector 1.3 upstream from the turbine 3 and opens at an opening 1.8 downstream from the turbine 3 and upstream from the particle filter 6.

For the purpose of controlling the exhaust gas flow within the exhaust gas line 2.3 on the one hand and the bypass line 1.1 on the other, the bypass line 1.1 has a bypass valve 1.4 and the exhaust gas line 2.3 has an exhaust gas flap 1.9.

As an alternative to the bypass valve 1.4 and to the exhaust gas flap 1.9 (shown in dashed lines), the bypass valve is formed as a three-way valve 1.4 and is provided at the opening 1.8.

A three-way catalytic converter 1.2 is provided within the bypass line 1.1.

Figure 2:
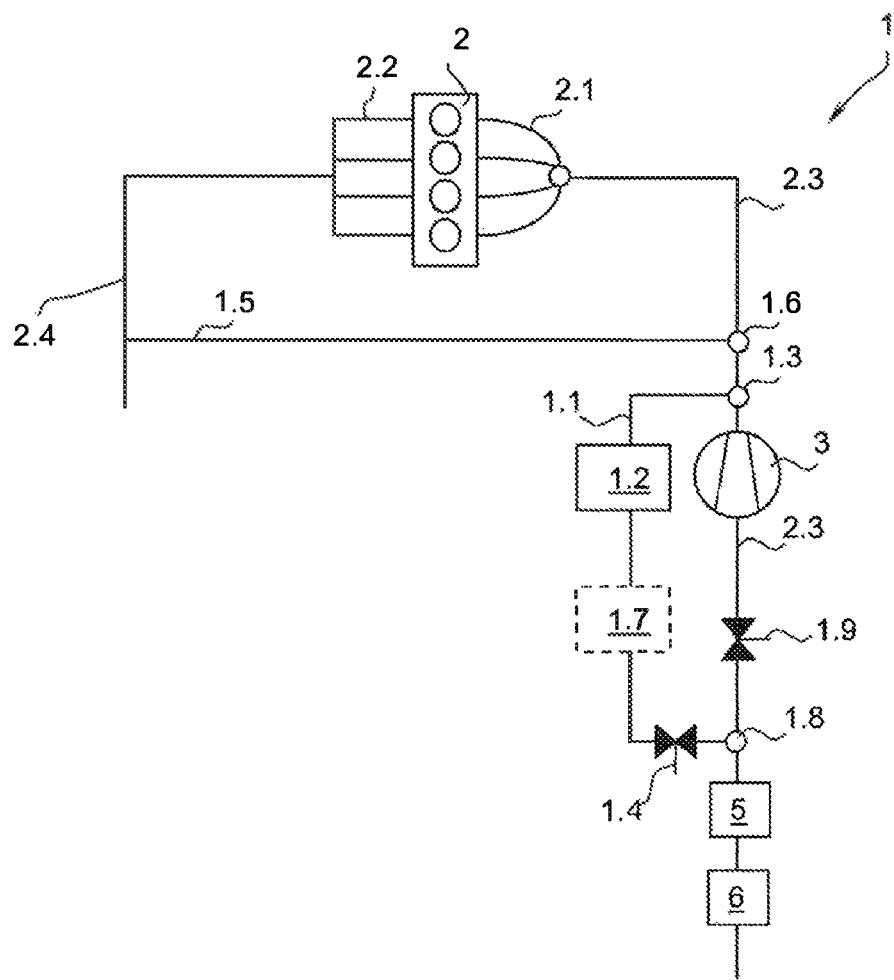
FIG. 2 depicts an alternative exemplary embodiment exhaust gas aftertreatment system.

In the alternative exemplary embodiment according to FIG. 2, a particle filter 1.7 is provided in the bypass line 1.1 in addition to the three-way catalytic converter 1.2.

In addition, the exhaust gas aftertreatment system 1 of the exemplary embodiment according to FIG. 2 has an exhaust gas recirculation line 1.5 which branches off at an EGR connector 1.6 on the exhaust gas line 2.3. The EGR connector 1.6 is positioned upstream from the bypass connector 1.3. Alternatively, the bypass connector 1.3 can also be positioned upstream from the EGR connector 1.6. In either case, the two connectors are separate and positioned upstream from the turbine 3.

Figure 3:
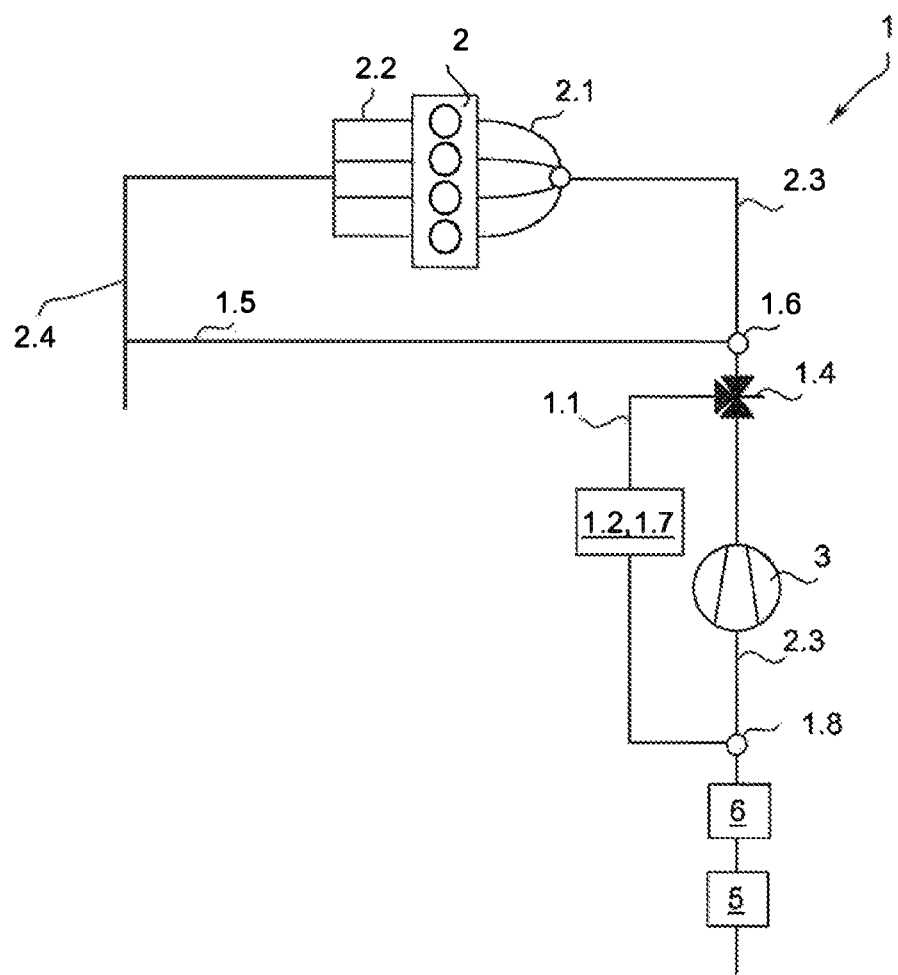
FIG. 3 depicts an alternative exemplary embodiment exhaust gas aftertreatment system.

According to the exemplary embodiment according to FIG. 3, as an alternative to the bypass valve 1.4 and the exhaust gas flap 1.9, a common three-way valve 1.4 is provided which forms the bypass connector 1.3 upstream from the turbine 3. The exhaust gas mass flow can be switched via this three-way valve 1.4 between the exhaust gas line 2.3 on the one hand and the bypass line 1.1 on the other. According to the exemplary embodiment according to FIG. 3, the particle filter 1.7 is provided with a three-way coating for treating nitrogen oxides.

Alternatively, in an exemplary embodiment which is not shown, the three-way valve 1.4 is positioned at the opening 1.8 of the bypass line 1.1, namely downstream from the turbine 3.

Figure 4:
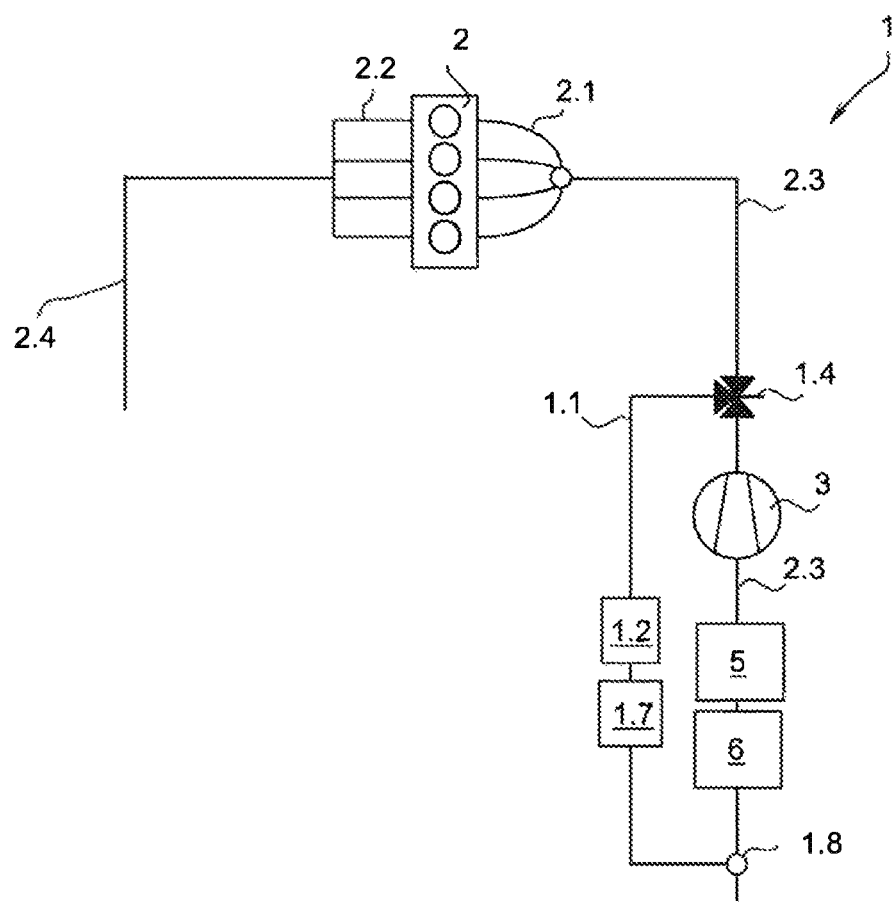
FIG. 4 depicts an alternative exemplary embodiment exhaust gas aftertreatment system.

According to exemplary embodiment FIG. 4, the bypass line 1.1 opens downstream from the main purification components, namely downstream from the main particle filter 6 and downstream from the main three-way catalytic converter 5 at the opening 1.8. Like the exhaust gas line 2.3, the bypass line 1.1 has a three-way catalytic converter 1.2 and a particle filter 1.7. The bypass connection is made via a three-way valve 1.4, which switches between the bypass line 1.1 and the exhaust gas line 2.3. When the bypass line 1.1 is closed, all the exhaust gas flows through the turbine 3 and the downstream purification components 5, 6. When the exhaust gas line 2.3 is closed, all the exhaust gas flows via the bypass line 1.1 through the two purification components 1.2, 1.7. During a cold start, the latter ensures very quick warming up of the three-way catalytic converter 1.2.

Figure 5:
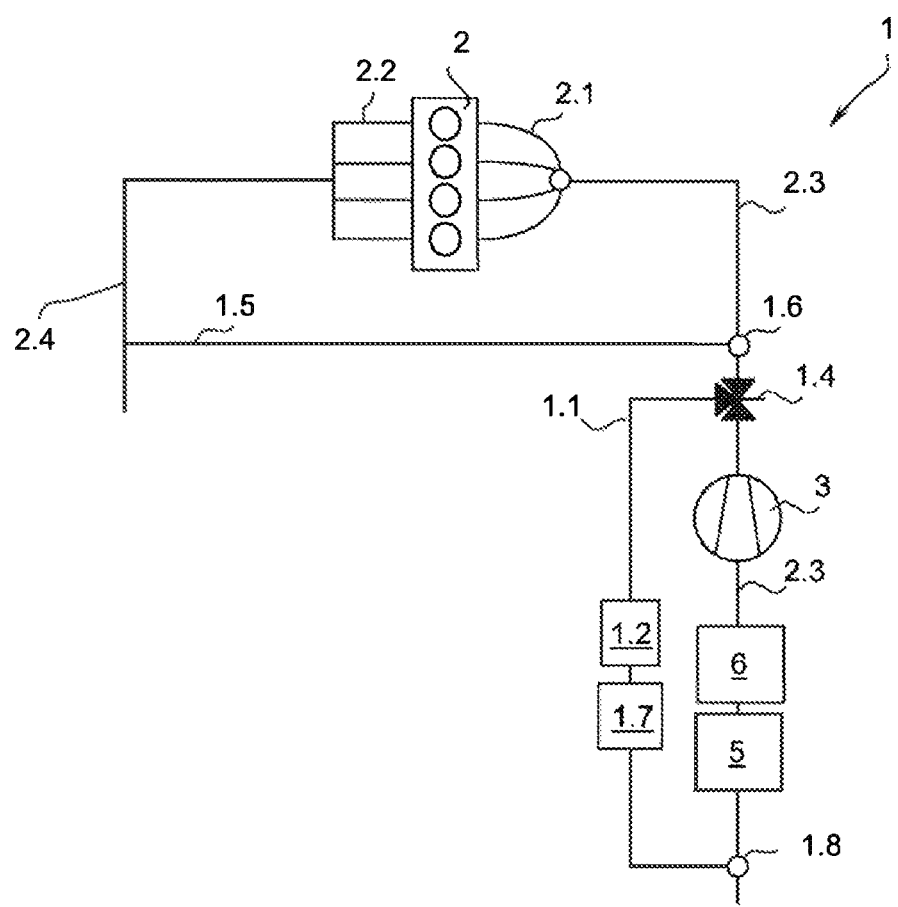
FIG. 5 depicts an alternative exemplary embodiment exhaust gas aftertreatment system.

The exemplary embodiment of FIG. 5 additionally provides an exhaust gas recirculation line 1.5 which branches off from the exhaust gas line 2.3 at an EGR connector 1.6.

Figure 6:
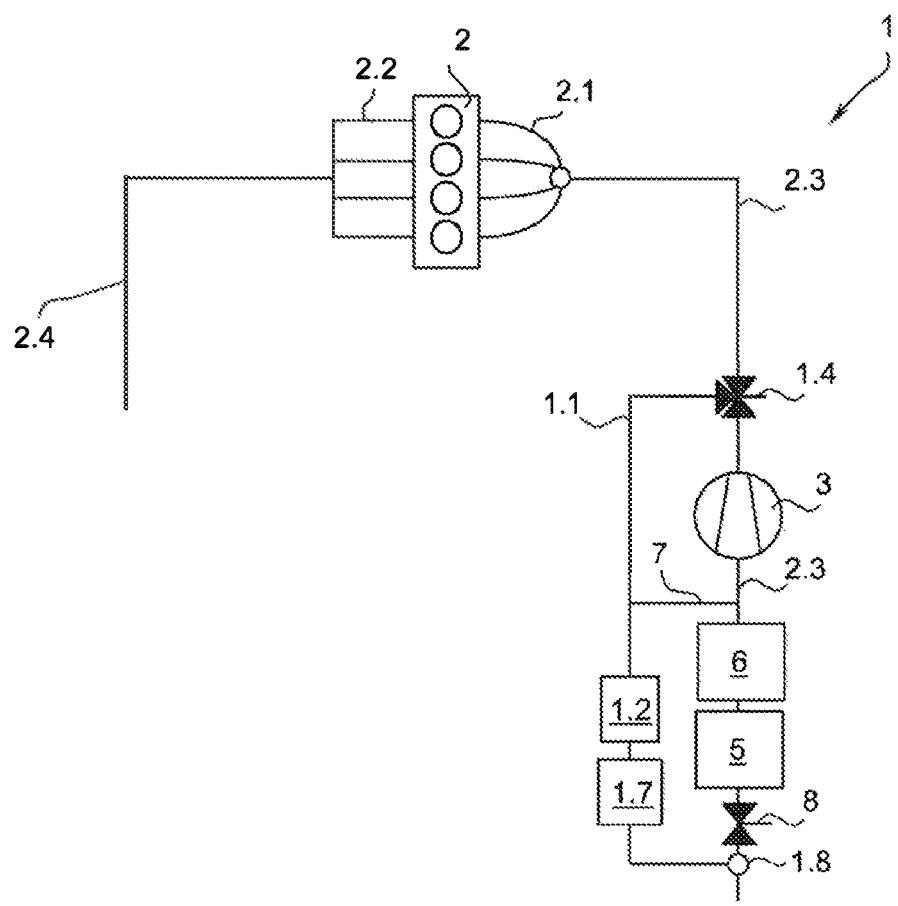
FIG. 6 depicts an alternative exemplary embodiment exhaust gas aftertreatment system.

The exemplary embodiment of FIG. 6 provides a coupling line 7 which branches off at the bypass line 1.1 upstream from the three-way catalytic converter and opens into the exhaust gas line 2.3 upstream from the particle filter 6. An exhaust gas control valve 8 is additionally provided which is positioned in the exhaust gas line 2.3 downstream from the main three-way catalytic converter 5 and upstream from the opening 1.8.

Figure 7:
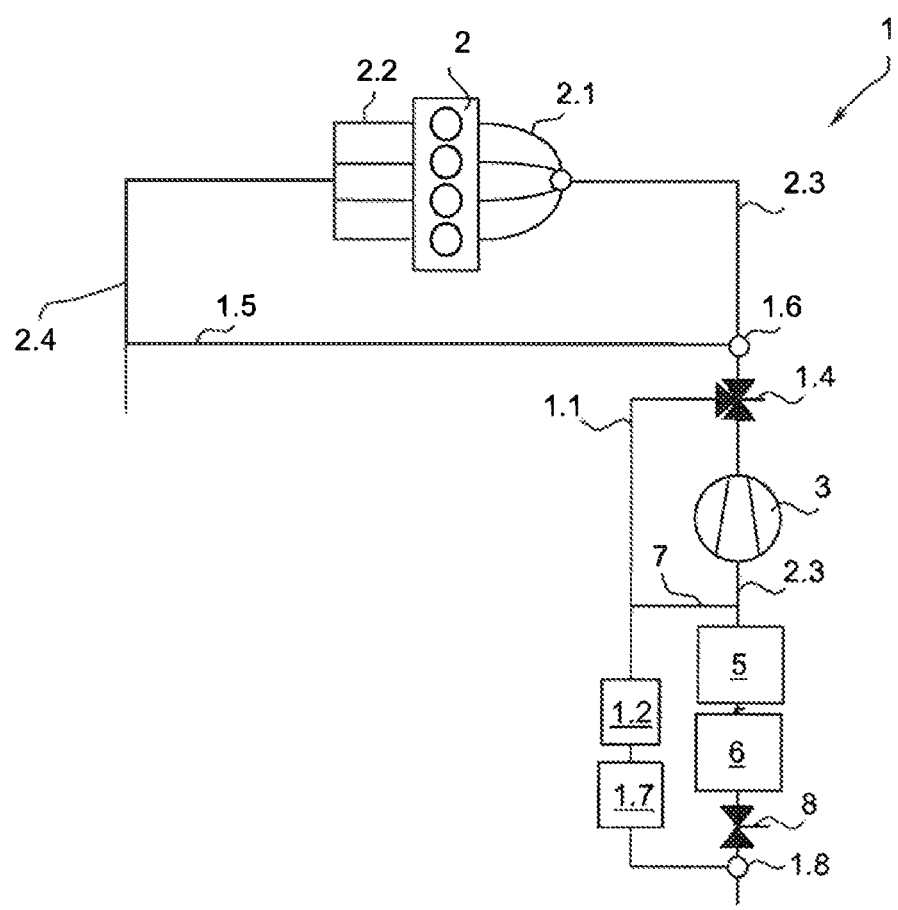
FIG. 7 depicts an alternative exemplary embodiment exhaust gas aftertreatment system.

The exemplary embodiment of FIG. 7 additionally provides the exhaust gas recirculation line 1.5 which branches off at the EGR connector 1.6 on the exhaust gas line 2.3 and opens into the fresh air line 2.4.

According to the exemplary embodiment of FIGS. 6, 7, the following switching variants are available. If the bypass line 1.1 is closed by means of the bypass valve 1.4, the exhaust gas volume flow can be guided when the exhaust gas control valve 8 is closed from the turbine 3 via the coupling line 7 and the purification components 1.2, 1.7 in the bypass line 1.1. When the exhaust gas control valve 8 is open, the exhaust gas flow is divided in accordance with the flow resistances between the purification components 1.2, 1.7 in the bypass line 1.1 on the one hand and the purification components 6, 5 in the exhaust gas line. Since the exhaust gas control valve 8 is a valve with more than two controlled and defined valve body positions, it is possible in the latter case continuously to adjust the exhaust gas flow within the exhaust gas line 2.3 between the prevailing maximum value and zero.

Alternatively, if the turbine 3 and the exhaust gas line 2.3 connected thereto is closed off by means of the bypass valve 1.4, all the exhaust gas flow flows via the bypass line 1.1. When the exhaust gas control valve 8 is closed, all the exhaust gas flow flows via the two purification components 1.2, 1.7 within the bypass line 1.1. When the exhaust gas control valve 8 is open or partially open, the exhaust gas flow to be guided via the exhaust gas line 2.3 and the purification components 6, 5 can be adjusted between the above-stated maximum value and zero.

The catalyst is generally positioned upstream from the particle filter because the catalyst requires corresponding exhaust gas temperatures. If sufficient exhaust gas temperatures are provided, it is also possible according to the exemplary embodiment of FIG. 6 to position the catalyst downstream from the particle filter. In this case, it suffers less fouling and can operate still more efficiently. The catalyst 1.2 in the bypass line 1.1 is located upstream from the particle filter and thus warms up very quickly after a cold start. If sufficient exhaust gas temperatures are available, the main duct can be supplied with hot exhaust gas via the valve 8 such that sufficient exhaust gas temperatures are likewise available for the main catalyst 5. It is accordingly provided that the sequence of catalyst and particle filter described according to the exemplary embodiments may in each case also be reversed.

The exemplary embodiments which are not separately shown are exhaust gas aftertreatment systems 1 for diesel engines 2. These exemplary embodiments differ from those previously described only by the catalytic formation of the catalysts 5, 1.2. The catalysts 5, 1.2 are DOC catalysts or the catalysts 5, 1.2 have a DOC coating. A main DOC catalytic converter 5 and a DOC catalytic converter 1.2 are namely in each case provided in the bypass line 1.1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. An exhaust gas aftertreatment system for an internal combustion engine with an exhaust gas line connectable to an exhaust manifold of the engine, with a turbine arranged in the exhaust gas line and with a main catalytic converter arranged downstream from the turbine, wherein the exhaust gas line has a bypass line and a bypass connector for the bypass line, wherein the bypass connector is provided upstream from the turbine on the exhaust gas line, wherein the bypass line opens into the exhaust gas line downstream from the turbine at an opening upstream from the main catalytic converter, wherein a bypass valve is provided, wherein a main particle filter is provided in the exhaust gas line downstream from the turbine and a catalytic converter is provided in the bypass line, wherein the bypass valve is formed as a three-way valve and forms the bypass connector upstream from the turbine and the internal combustion engine is formed as a spark ignition engine, wherein the respective main catalytic converter has a three-way coating or the internal combustion engine is formed as a diesel engine, wherein the respective main catalytic converter has a diesel oxidation catalyst (DOC) coating, and the bypass line is formed without bypass valves with the exception of the bypass valve, wherein the exhaust gas line is closed off by means of an exhaust gas flap during a cold start and the entire exhaust gas flow is guided via the bypass line to the opening and to the further exhaust gas system when the bypass valve is open.

2. The exhaust gas aftertreatment system according to claim 1, wherein a particle filter is additionally provided in the bypass line.

3. The exhaust gas aftertreatment system according to claim 1, wherein the bypass valve is able to be brought into a maximum of two defined positions which are determined by an end abutment.

4. The exhaust gas aftertreatment system according to claim 1, wherein the main catalytic converter and the main particle filter are formed as particle filters with a catalytically acting three-way or DOC coating.

5. The exhaust gas after treatment system according to claim 1, wherein the bypass line is formed without a particle filter.

6. An exhaust gas aftertreatment system for an internal combustion engine with an exhaust gas line connectable to an exhaust manifold of the engine, with a turbine arranged in the exhaust gas line and with a main catalytic converter arranged downstream from the turbine, wherein the exhaust gas line has a bypass line and a bypass valve, wherein the bypass valve is positioned on the exhaust gas line upstream from the turbine, wherein the bypass line opens into the exhaust gas line at an opening downstream from the turbine, wherein a main particle filter is provided downstream from the turbine in the exhaust gas line and a particle filter and a catalytic converter are provided in the bypass line, wherein the opening of the bypass line is provided downstream from the main catalytic converter and downstream from the main particle filter and the internal combustion engine is formed as a spark ignition engine, wherein the respective main catalytic converter has a three-way coating or the internal combustion engine is formed as a diesel engine, wherein the respective main catalytic converter has a diesel oxidation catalyst (DOC) coating, wherein the exhaust gas line has an exhaust gas recirculation line and an EGR connector for the exhaust gas recirculation line upstream from the turbine, wherein the EGR connector is arranged in the exhaust gas line upstream or downstream from the bypass connector.

7. The exhaust gas aftertreatment system according to claim 6, wherein the bypass line has a coupling line which branches off upstream from the particle filter and upstream from the catalytic converter and which opens into the exhaust gas line upstream from the main particle filter and upstream from the main catalytic converter.

8. The exhaust gas aftertreatment system according to claim 6, wherein an exhaust gas control valve is provided in the exhaust gas line downstream from the main particle filter, downstream from the main catalytic converter and upstream from the opening, which is able to be brought into more than two defined positions and via which an exhaust gas volume flow within the exhaust gas line is controllable in more than two settings.

9. The exhaust gas aftertreatment system according to claim 6, wherein an exhaust gas volume flow A is guided into the bypass line via the bypass valve, wherein at least a part of the exhaust gas volume flow A is guided via a coupling line into the exhaust gas line by corresponding opening of an exhaust gas control valve.

10. An exhaust gas aftertreatment system for an internal combustion engine with an exhaust gas line connectable to an exhaust manifold of the engine, with a turbine arranged in the exhaust gas line and with a main catalytic converter arranged downstream from the turbine, wherein the exhaust gas line has a bypass line and a bypass connector for the bypass line, wherein the bypass connector is provided upstream from the turbine on the exhaust gas line, wherein the bypass line opens into the exhaust gas line downstream from the turbine at an opening upstream from the main catalytic converter, wherein a bypass valve is provided, wherein a main particle filter is provided in the exhaust gas line downstream from the turbine and a catalytic converter is provided in the bypass line, wherein the bypass valve is formed as a three-way valve and forms the bypass connector upstream from the turbine and the internal combustion engine is formed as a spark ignition engine, wherein the respective main catalytic converter has a three-way coating or the internal combustion engine is formed as a diesel engine, wherein the respective main catalytic converter has a diesel oxidation catalyst (DOC) coating, and the further line is formed without bypass valves with the exception of the bypass valve, wherein the exhaust gas line is formed without exhaust gas recirculation lines or the exhaust gas line has an exhaust gas recirculation line and an EGR connector for the exhaust gas recirculation line upstream from the turbine, wherein the EGR connector is positioned upstream or downstream from the bypass connector, wherein the exhaust gas line is closed off by means of an exhaust gas flap during a cold start and the entire exhaust gas flow is guided via the bypass line to the opening and to the further exhaust gas system when the bypass valve is open.

\* \* \* \* \*